(12) United States Patent
Kelley, Jr.

(10) Patent No.: US 8,367,952 B2
(45) Date of Patent: Feb. 5, 2013

(54) ACCELERATION SENSOR

(75) Inventor: Whitmore B. Kelley, Jr., Lebanon, NH (US)

(73) Assignee: SignalQuest, Inc., Lebanon, NH (US)

( * ) Notice: Subject to any disclaimer, the term of this patent is extended or adjusted under 35 U.S.C. 154(b) by 279 days.

(21) Appl. No.: 12/398,925

(22) Filed: Mar. 5, 2009

(65) Prior Publication Data

US 2009/0223788 A1 Sep. 10, 2009

Related U.S. Application Data

(60) Provisional application No. 61/033,865, filed on Mar. 5, 2008.

(51) Int. Cl.
*H01H 35/14* (2006.01)

(52) U.S. Cl. .......... 200/61.45 R; 200/61.48; 200/61.51; 200/61.53

(58) Field of Classification Search . 200/61.45 R–61.53
See application file for complete search history.

(56) References Cited

U.S. PATENT DOCUMENTS

| | | | | |
|---|---|---|---|---|
| 3,502,831 A * | 3/1970 | McRoskey | ................. | 200/61.49 |
| 3,649,787 A * | 3/1972 | Kasabian | ................ | 200/61.45 R |
| 4,225,802 A | 9/1980 | Suzuki et al. | | |
| 4,337,402 A | 6/1982 | Nowakowski | | |
| 4,594,485 A | 6/1986 | Brown, Jr. | | |
| 5,136,127 A * | 8/1992 | Blair | .......................... | 200/61.52 |
| 5,272,293 A * | 12/1993 | Abbin et al. | ............... | 200/61.53 |
| 5,672,856 A * | 9/1997 | Kolb et al. | ................. | 200/61.52 |
| 5,955,712 A * | 9/1999 | Zakutin | ....................... | 200/61.48 |
| 6,555,772 B1* | 4/2003 | Chou | ..................... | 200/61.45 R |
| 6,741,170 B2* | 5/2004 | Alrabady | ...................... | 340/438 |
| 6,784,386 B2* | 8/2004 | Chou et al. | ................. | 200/61.51 |
| 6,949,713 B2* | 9/2005 | Weng et al. | ............. | 200/61.45 R |
| 7,465,893 B2* | 12/2008 | Chou | .................... | 200/61.45 R |
| 7,592,556 B2* | 9/2009 | Chou et al. | ............. | 200/61.45 R |
| 7,829,804 B2* | 11/2010 | Chou | .................... | 200/61.45 R |

FOREIGN PATENT DOCUMENTS

| | | |
|---|---|---|
| CN | 2812267 Y | 8/2006 |
| CN | 101116164 A | 1/2008 |
| WO | WO2006/078602 | 7/2006 |

* cited by examiner

*Primary Examiner* — Michael Friedhofer
(74) *Attorney, Agent, or Firm* — Peter A. Nieves; Sheehan Phinney Bass + Green PA

(57) ABSTRACT

An acceleration sensor is provided. The acceleration sensor contains a first electrically conductive element and a second electrically conductive element. An electrically insulative element is connected to the first electrically conductive element and the second electrically conductive element, where at least a portion of the first electrically conductive element and at least a portion of the second electrically conductive element make contact with the electrically insulative element. At least one electrically conductive spring is located within a cavity of the sensor, wherein the cavity is defined by at least one surface of the first electrically conductive element, at least one surface of the electrically insulative element, and at least one surface of the second electrically conductive element.

6 Claims, 16 Drawing Sheets

Closed Position

Open Position

Closed Position

Open Position

Open Position

Closed Position

Open Position
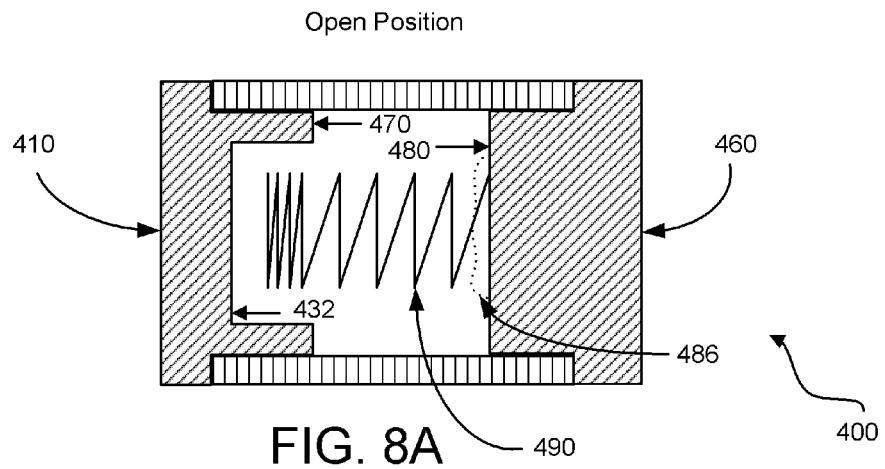
FIG. 8A
Closed Position 1
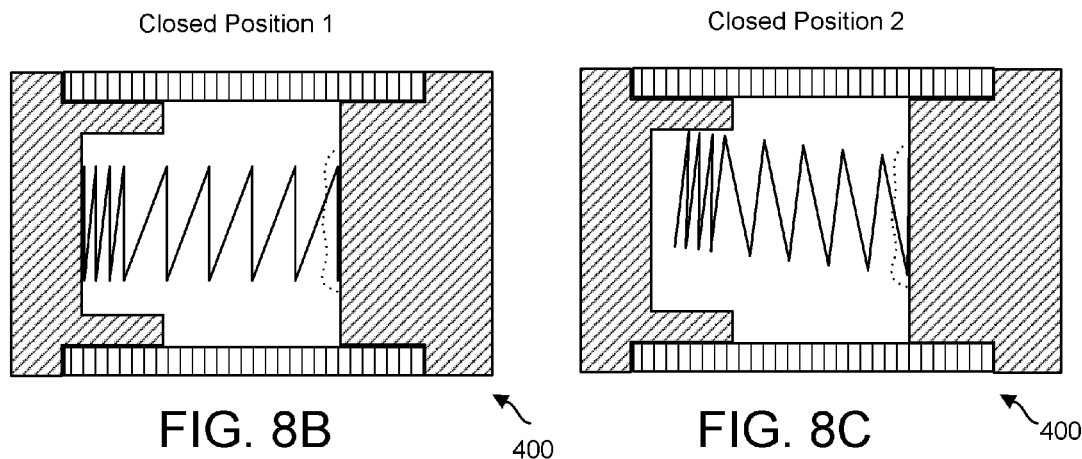
FIG. 8B
Closed Position 2
FIG. 8C
Closed Position 3
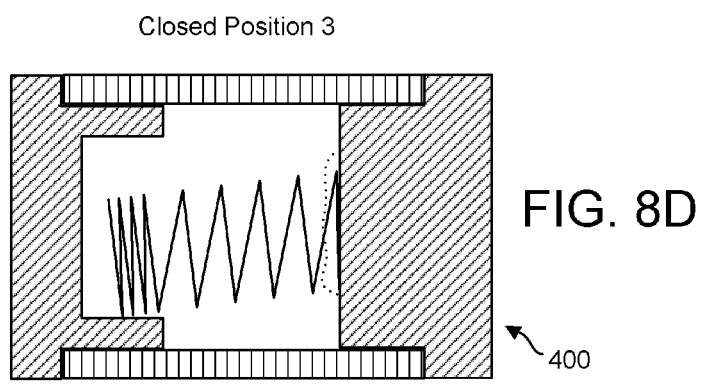
FIG. 8D Closed Position Open Position Open Position Closed Position

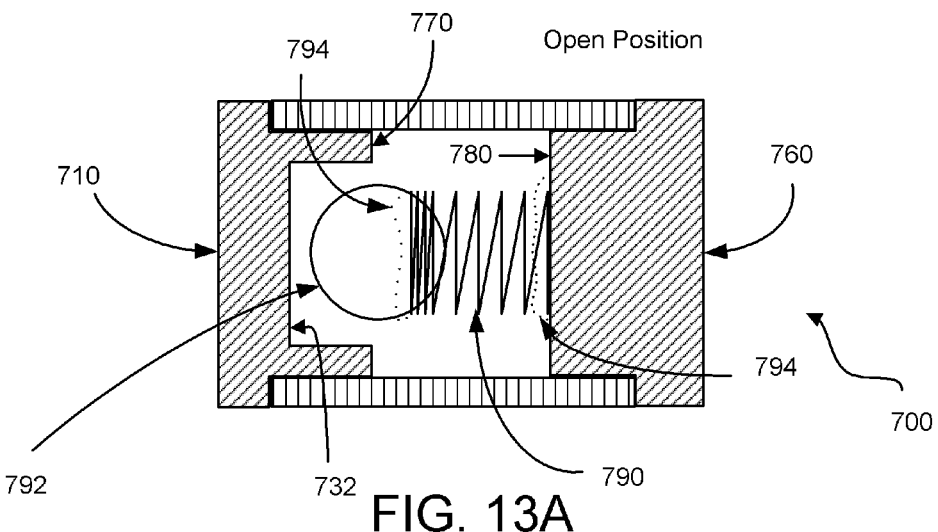
FIG. 13A
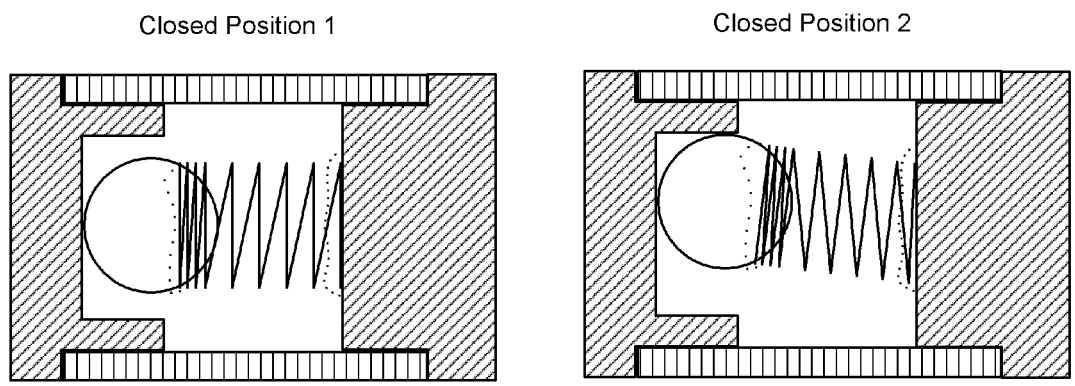
FIG. 13B  FIG. 13C
FIG. 13D

ACCELERATION SENSOR

CROSS-REFERENCE TO RELATED APPLICATIONS

This application claims priority to U.S. Provisional Application entitled, "ACCELERATION SENSOR," having Ser. No. 61/033,865, filed Mar. 5, 2008, which is entirely incorporated herein by reference.

FIELD OF THE INVENTION

The present invention is generally related to sensors, and more particularly is related to an acceleration sensor.

BACKGROUND OF THE INVENTION

Many different acceleration sensors are presently available and known to those having ordinary skill in the art. As is known by those having ordinary skill in the art, acceleration sensors open and close under the influence of acceleration.

Unfortunately, present acceleration sensors contain many components. In addition, present acceleration sensors are complicated to construct. The abovementioned leads to increased cost for acceleration sensors. It is also unfortunate that typical acceleration sensors are not surface mountable so as to allow the acceleration sensors to be attached to, for example, the surface of a circuit board without wires.

Thus, a heretofore unaddressed need exists in the industry to address the aforementioned deficiencies and inadequacies.

SUMMARY OF THE INVENTION

Embodiments of the present invention provide an acceleration sensor and a method of construction thereof. Briefly described, in architecture, one embodiment of the system, among others, can be implemented as follows. The acceleration sensor contains a first electrically conductive element and a second electrically conductive element. An electrically insulative element is connected to the first electrically conductive element and the second electrically conductive element, where at least a portion of the first electrically conductive element and at least a portion of the second electrically conductive element make contact with the electrically insulative element. At least one electrically conductive spring is located within a cavity of the sensor, wherein the cavity is defined by at least one surface of the first electrically conductive element, at least one surface of the electrically insulative element, and at least one surface of the second electrically conductive element.

Other systems, methods, and features of the present invention will be or will become apparent to one with skill in the art upon examination of the following drawings and detailed description. It is intended that all such additional systems, methods, and features be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 8A, FIG. 8B, FIG. 8C, and FIG. 8D are cross-sectional side views of an acceleration sensor in accordance with a third exemplary embodiment of the invention, where FIG. 8A exemplifies the sensor in an open position, and FIGS. 8B-8D exemplify the sensor in a closed position.

FIG. 13A, FIG. 13B, FIG. 13C, and FIG. 13D are cross-sectional side views of an acceleration sensor in accordance with a sixth exemplary embodiment of the invention, where FIG. 13A exemplifies the sensor in an open position, and FIGS. 13B-13D exemplify the sensor in a closed position.

DETAILED DESCRIPTION

Figure 1:
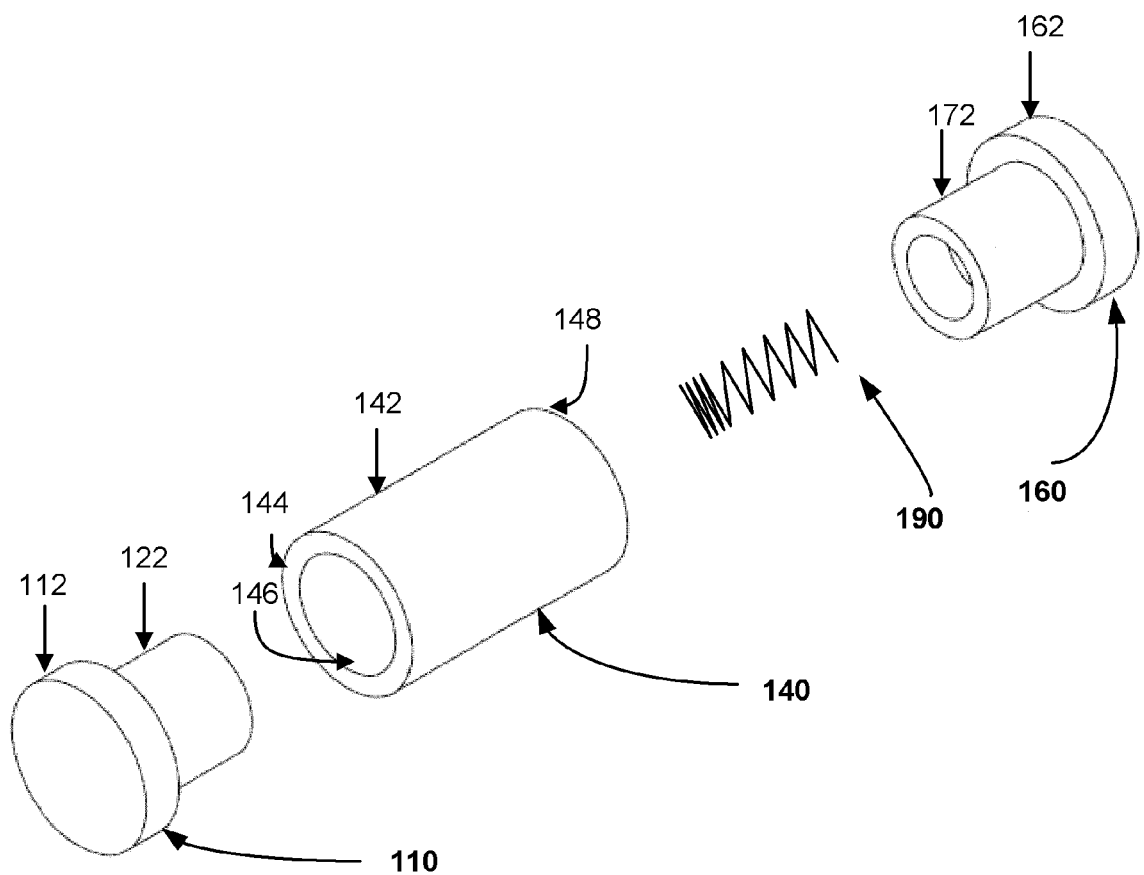
FIG. 1 is an exploded perspective side view of the present acceleration sensor, in accordance with a first exemplary embodiment of the invention.

The present invention provides an acceleration sensor. The sensor contains a minimal number of cooperating parts to ensure ease of assembly and use. FIG. 1 is an exploded perspective side view of the present acceleration sensor 100 (hereafter, "the sensor 100"), in accordance with a first exemplary embodiment of the invention.

Referring to FIG. 1, the sensor 100 contains a first end cap 110, a central member 140, a second end cap 160, and a spring 190. The first end cap 110 is conductive, having a proximate portion 112 and a distal portion 122. The first end cap 110 may be constructed from a composite of high conductivity and/or low reactivity metals, a conductive plastic, or any other conductive material.

Figure 2:
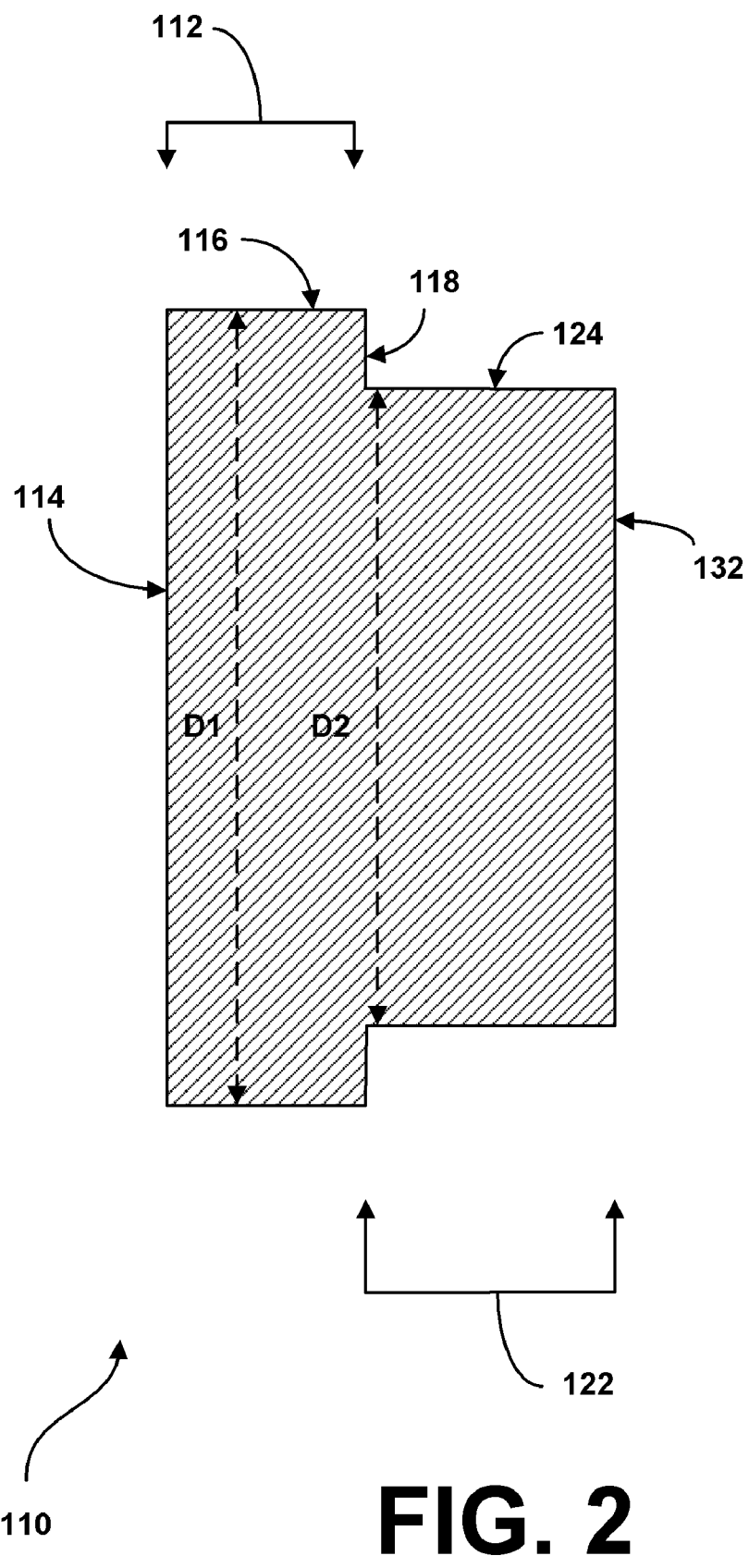
FIG. 2 is a cross-sectional side view of the first end cap, which may be referred to for a better understanding of the location of portions of the first end cap.

FIG. 2 is a cross-sectional side view of the first end cap 110, which may be referred to for a better understanding of the location of portions of the first end cap 110. The proximate portion 112 of the first end cap 110 is circular, having a diameter D1, and having an end surface 114, described herein as being flat. A top surface 116 of the proximate portion 112 runs perpendicular to the end surface 114. A width of the top surface 116 is the same width as a width of the entire proximate portion 112 of the first end cap 110. The proximate portion 112 also contains an internal surface 118 located on a side of the proximate portion 112 that is opposite to the end surface 114, where the top surface 116 runs perpendicular to the internal surface 118. Therefore, the proximate portion 112 is in the shape of a disk. The disk shape of the first end cap 110 is also referred to herein as a flange of the first end cap 110.

It should be noted that while FIG. 2 illustrates the proximate portion 112 of the first end cap 110 having a flat end surface 114 and the proximate portion 162 (FIG. 4) of the second end cap 160 having a flat surface 164 (FIG. 4), one having ordinary skill in the art would appreciate that the proximate portions 112, 162 (FIG. 4) do not require presence of a flat end surface. Instead, the end surfaces 114, 164 may be convex or concave. In addition, instead of being circular, the first end cap 110 and the second end cap 160 may be square-like in shape, or they may be any other shape. Use of circular end caps 110, 160 is merely provided for exemplary purposes. The main function of the end caps 110, 160 is to provide a connection to allow an electrical charge introduced to the first end cap 110 to traverse the spring 190 and be received by the second end cap 160, or vice versa, therefore, many different shapes and sizes of end caps 110, 160 may be used as long as the conductive path is maintained.

Referring to FIG. 2, the relationship between the top portion 116, the end surface 114, and the internal surface 118 described herein is provided for exemplary purposes. Alternatively, the end surface 114 and the internal surface 118 may have rounded or otherwise contoured ends resulting in the top surface 116 of the proximate portion 112 being a natural rounded progression of the end surface 114 and the internal surface 118.

The distal portion 122 of the first end cap 110 has a diameter D2 that is smaller than the diameter D1 of the proximate portion 112. The distal portion 122 of the first end cap 110 contains a top surface 124 and an inner surface 132, where the top surface 124 is perpendicular to the inner surface 132.

Progression from the proximate portion 112 of the first end cap 110 to the distal portion 122 of the first end cap 110 is defined by a step where a top portion of the step is defined by the top surface 116 of the proximate portion 112, a middle portion of the step is defined by the internal surface 118 of the proximate portion 112, and a bottom portion of the step is defined by the top surface 124 of the distal portion 122.

As is better shown by FIG. 2, the distal portion 122 of the first end cap 110 is an extension of the proximate portion 112 of the first end cap 110. While FIG. 2 illustrates the inner surface 132 as running parallel to the flat end surface 114, as is noted hereafter, the inner surface 132 may instead be concave, conical, or hemispherical.

Figure 3:
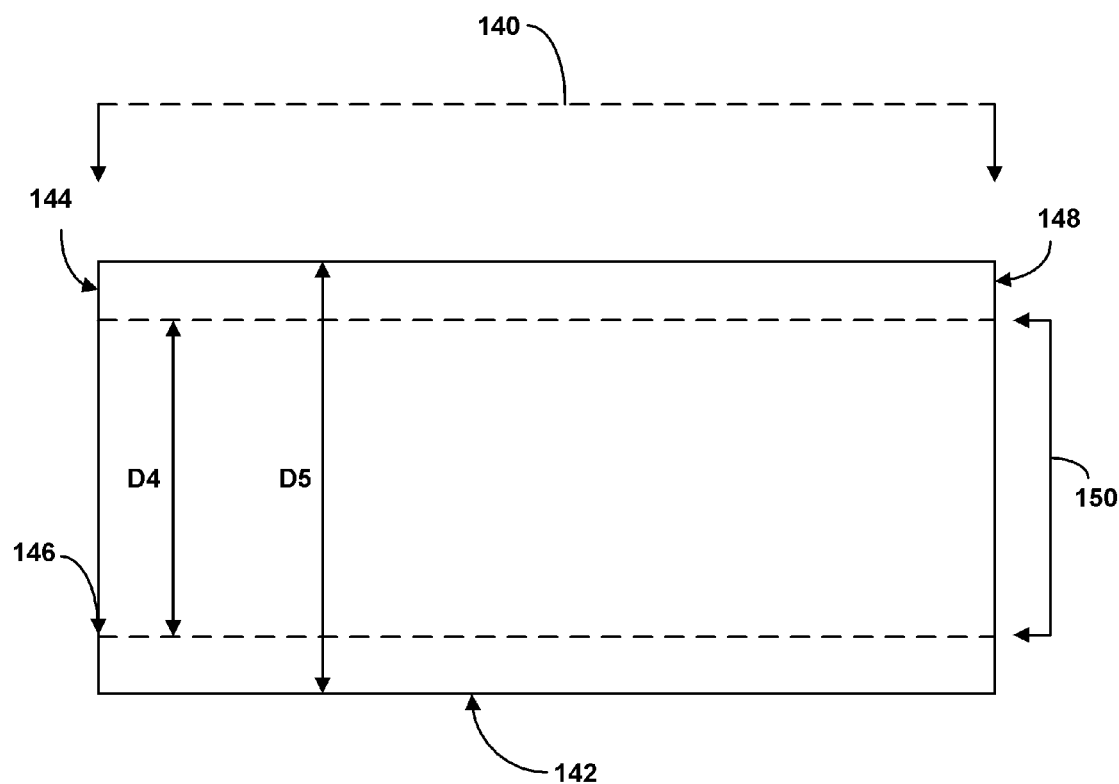
FIG. 3 is a cross-sectional side view of the central member and may also be referred to for a better understanding of the location of portions of the central member.

Referring to FIG. 1, the central member 140 of the sensor 100 is tube-like in shape, having a top surface 142, a proximate surface 144, a bottom surface 146, and a distal surface 148. FIG. 3 is a cross-sectional side view of the central member 140 and may also be referred to for a better understanding of the location of portions of the central member 140. It should be noted that the central member 140 need not be tube-like in shape. Alternatively, the central member 140 may have a different shape, such as, but not limited to that of a square.

The bottom surface 146 of the central member 140 defines a hollow center 150 having a diameter D4 that is just slightly larger than the diameter D2 (FIG. 2), thereby allowing the distal portion 122 of the first end cap 110 to fit within the hollow center 150 of the central member 140 (FIG. 3). In addition, the top surface 142 of the central member 140 defines the outer surface of the central member 140 where the central member 140 has a diameter D5. It should be noted that the diameter D1 (i.e., the diameter of the proximate portion 112 of the first end cap 110) is preferably slightly larger than diameter D5 (i.e., the diameter of the central member 140). Of course, different dimensions of the central member 140 and end caps 110, 160 may also be provided. In addition, when the sensor 100 is assembled, the proximate surface 144 of the central member 140 rests against the internal surface 118 of the first end cap 110.

Unlike the first end cap 110 and the second end cap 160, the central member 140 is not electrically conductive. As an example, the central member 140 may be made of plastic, glass, or any other nonconductive material. In an alternative embodiment of the invention, the central member 140 may also be constructed of a material having a high melting point that is above that used by commonly used soldering materials. As is further explained in detail below, having the central member 140 non-conductive ensures that the electrical conductivity provided by the sensor 100 is provided through use of the spring 190. Specifically, location of the central member 140 between the first end cap 110 and the second end cap 160 provides a non-conductive gap between the first end cap 110 and the second end cap 160.

Referring to FIG. 1, the second end cap 160 is conductive, having a proximate portion 162 and a distal portion 172. Specifically, the second end cap 160 may be constructed from a composite of high conductivity and/or low reactivity metals, a conductive plastic, or any other conductive material.

Figure 4:
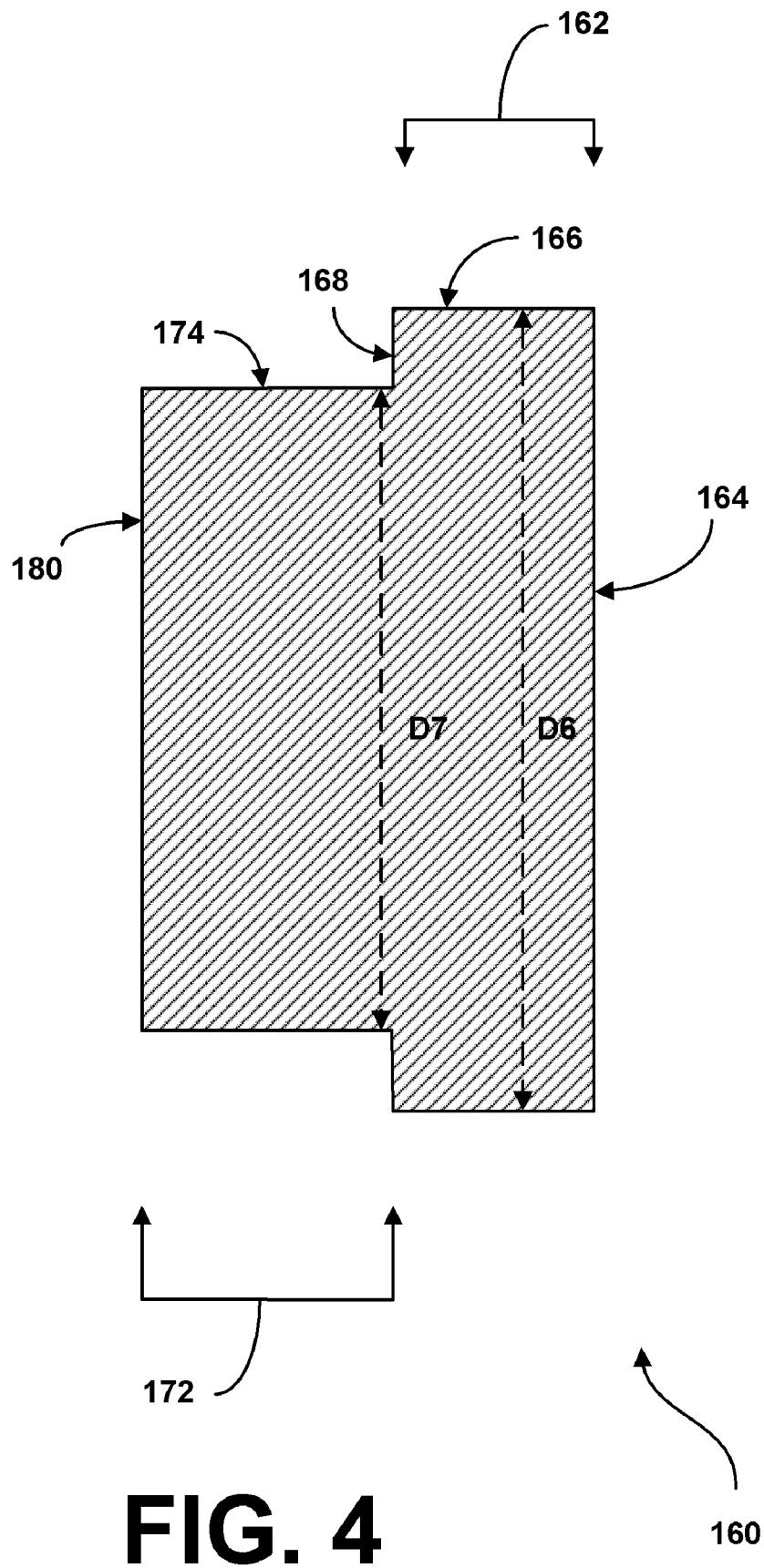
FIG. 4 is a cross-sectional side view of the second end cap, which may be referred to for a better understanding of the location of portions of the second end cap.

FIG. 4 is a cross-sectional side view of the second end cap 160 which may be referred to for a better understanding of the location of portions of the second end cap 160. The proximate portion 162 of the second end cap 160 is circular, having a diameter D6, and having a flat end surface 164. A top surface 166 of the proximate portion 162 runs perpendicular to the flat end surface 164. A width of the top surface 166 is the same width as a width of the entire proximate portion 162 of the second end cap 160. The proximate portion 162 also contains an internal surface 168 located on a side of the proximate portion 162 that is opposite to the flat end surface 164, where the top surface 166 runs perpendicular to the internal surface 168. Therefore, the proximate portion 162 is in the shape of a disk. The disk shape of the second end cap 160 is also referred to herein as a flange of the second end cap 160.

The relationship between the top portion 166, the flat end surface 164, and the internal surface 168 described herein is provided for exemplary purposes. Alternatively, the flat end surface 164 and the internal surface 168 may have rounded or otherwise contoured ends resulting in the top surface 166 of the proximate portion 162 being a natural rounded progression of the end surface 164 and the internal surface 168.

The distal portion 172 of the second end cap 160 has a diameter D7 that is smaller than the diameter D6 of the proximate portion 162. The distal portion 172 of the second end cap 160 contains a top surface 174 and an inner surface 180, where the inner surface 180 is perpendicular to the top surface 174. It should be noted that while FIG. 4 shows the cross-section of the inner surface 180 as being squared to the top surface 174, the inner surface 180 may instead be rounded or of a different shape.

Progression from the proximate portion 162 of the second end cap 160 to the distal portion 172 of the second end cap 160 is defined by a step where a top portion of the step is defined by the top surface 166 of the proximate portion 162, a middle portion of the step is defined by the internal surface 168 of the proximate portion 162, and a bottom portion of the step is defined by the top surface 174 of the distal portion 172. As is better shown by FIG. 4, the distal portion 172 of the second end cap 160 is an extension of the proximate portion 162 of the second end cap 160.

It should be noted that dimensions of the second end cap 160 are preferably the same as dimensions of the first end cap 110. Therefore, the diameter D4 of the central member 140 hollow center 150 is also just slightly larger that the diameter D7 of the second end cap 160, thereby allowing the distal portion 172 of the second end cap 160 to fit within the hollow center 150 of the central member 140. In addition, the diameter D6 (i.e., the diameter of the proximate portion 162 of the second end cap 160) is preferably slightly larger that diameter D5 (i.e., the diameter of the central member 140). Further, when the sensor 100 is assembled, the distal surface 148 of the central member 140 rests against the internal surface 168 of the second end cap 160.

Referring to FIG. 1, the spring 190 is conductive and fits within the central member 140. Specifically, the inner surface 132 of the first end cap 110, the bottom surface 146 of the central member 140, and the inner surface 180 of the second end cap 160 form a central cavity 200 of the sensor 100 where the spring 190 is confined.

Figure 5A:
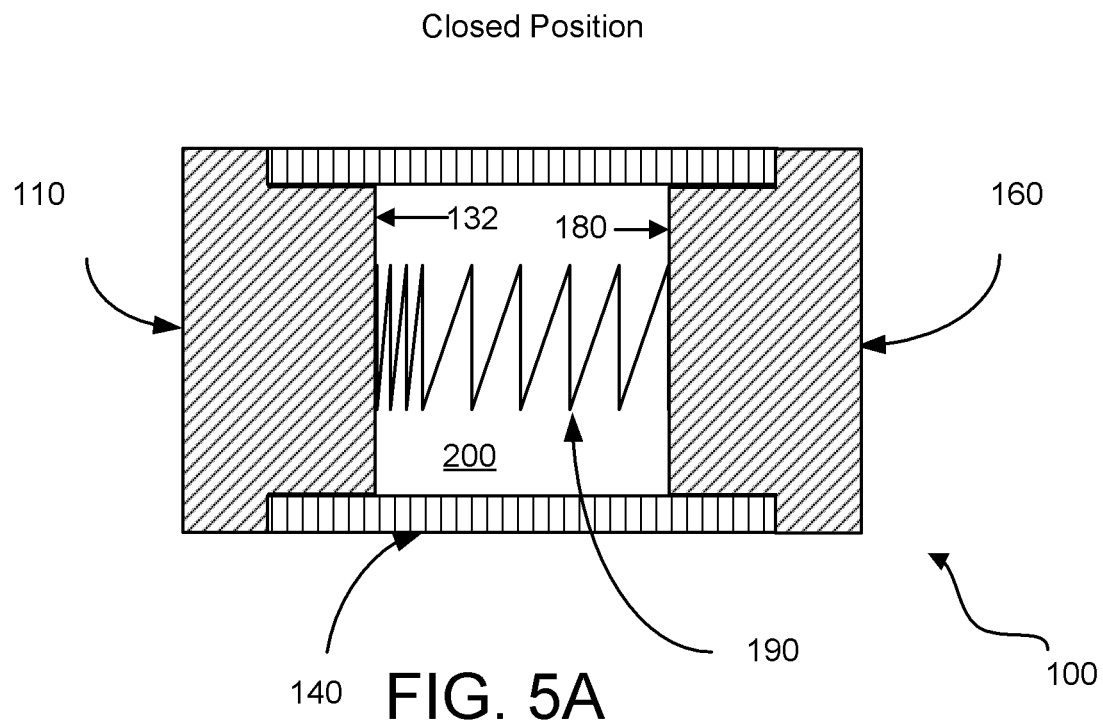
FIG. 5A and FIG. 5B are cross-sectional side views of the acceleration sensor in accordance with the first exemplary embodiment of the invention, where FIG. 5A exemplifies the sensor in a closed position and FIG. 5B exemplifies the sensor in an open position.
Figure 5B:
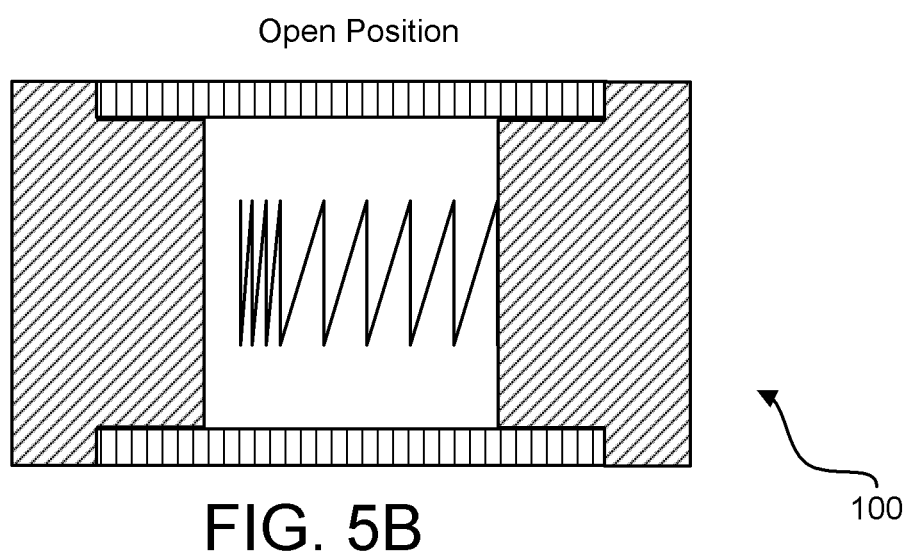

FIG. 5A and FIG. 5B are cross-sectional side views of the acceleration sensor 100 in accordance with a first exemplary embodiment of the invention, where FIG. 5A exemplifies the sensor 100 in a closed position and FIG. 5B exemplifies the sensor 100 in an open position. When at rest, the sensor 100 is in the closed position (FIG. 5A), where the spring 190 touches the inner surface 132 of the first end cap 110 and the inner surface 180 of the second end cap 160. Alternatively, as shown by FIG. 5B, when an immediate acceleration is applied to either the first end cap 110 or the second end cap 160, the spring 190 is displaced horizontally, resulting in conduction no longer being provided between the first end cap 110 and the second end cap 160. It should be noted that in accordance with the first exemplary embodiment of the invention of FIG. 5A and FIG. 5B, the spring 190 remains suspended within the central cavity 200 due to pressure being applied against the spring 190 by the inner surface 132 of the first end cap 110 and the inner surface 180 of the second end cap 160.

Figure 6A:
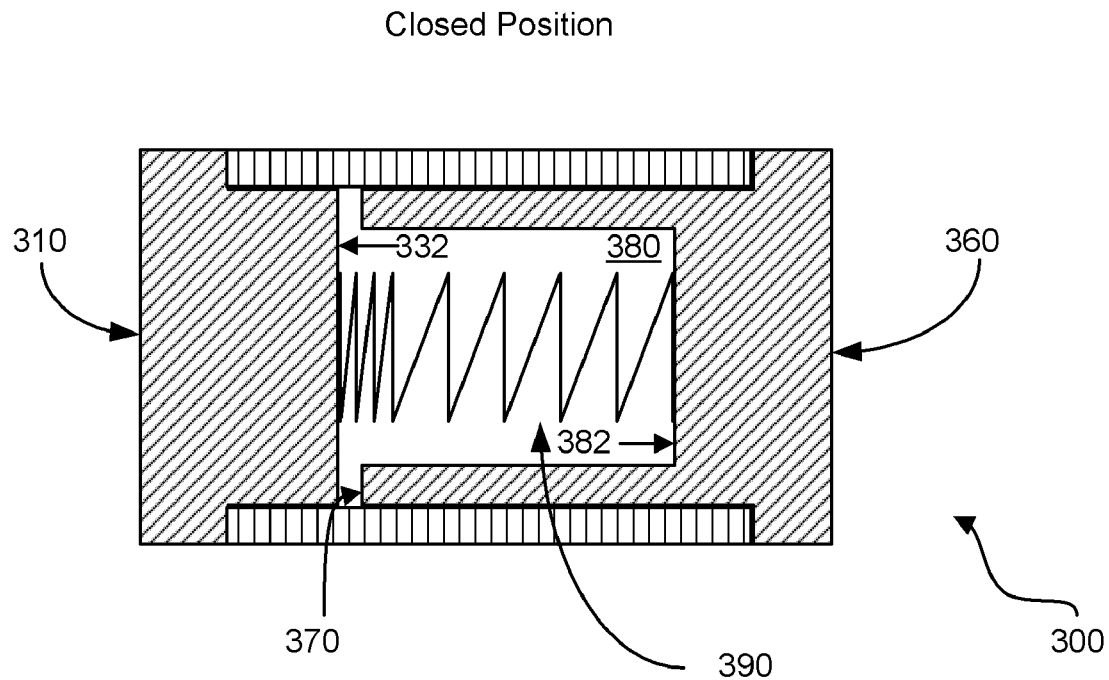
FIG. 6A and FIG. 6B are cross-sectional side views of an acceleration sensor in accordance with a second exemplary embodiment of the invention, where FIG. 6A exemplifies the sensor in a closed position and FIG. 6B exemplifies the sensor in an open position.
Figure 6B:
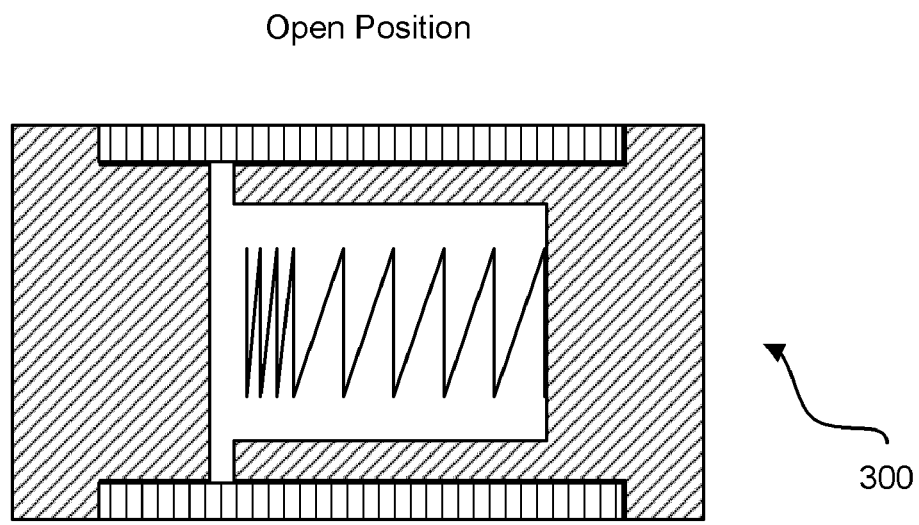

FIG. 6A and FIG. 6B are cross-sectional side views of an acceleration sensor 300 in accordance with a second exemplary embodiment of the invention, where FIG. 6A exemplifies the sensor 300 in a closed position and FIG. 6B exemplifies the sensor 300 in an open position. While a first end cap 310 of the second exemplary embodiment acceleration sensor 300 is the same as the first end cap 110 of the first exemplary embodiment, a second end cap 360 of the second exemplary embodiment is different from the second end cap 160 of the first exemplary embodiment. Specifically, the second end cap 360 contains a cylindrical lip 370 that extends further into a central cavity 380 of the acceleration sensor 300. It should be noted that in accordance with the second exemplary embodiment of the invention, the spring 390 remains suspended within the central cavity 380 due to pressure being applied against the spring 390 by an inner surface 332 of the first end cap 310 and an inner surface 382 of the second end cap 360.

Figure 7A:
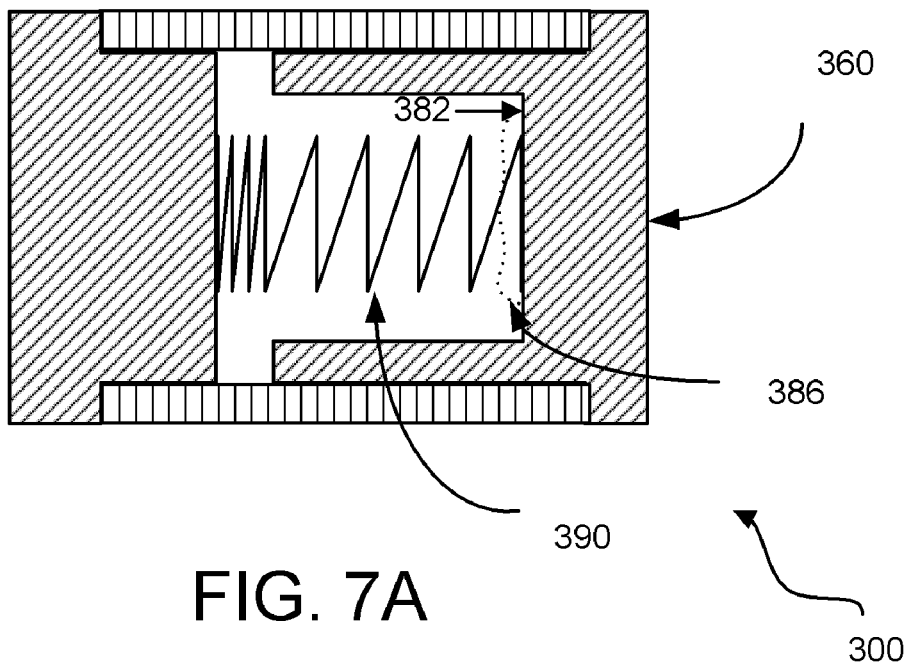
FIG. 7A and FIG. 7B illustrate an acceleration sensor where the spring is connected to the inner surface of the second end cap through one or more of many different means.
Figure 7B:
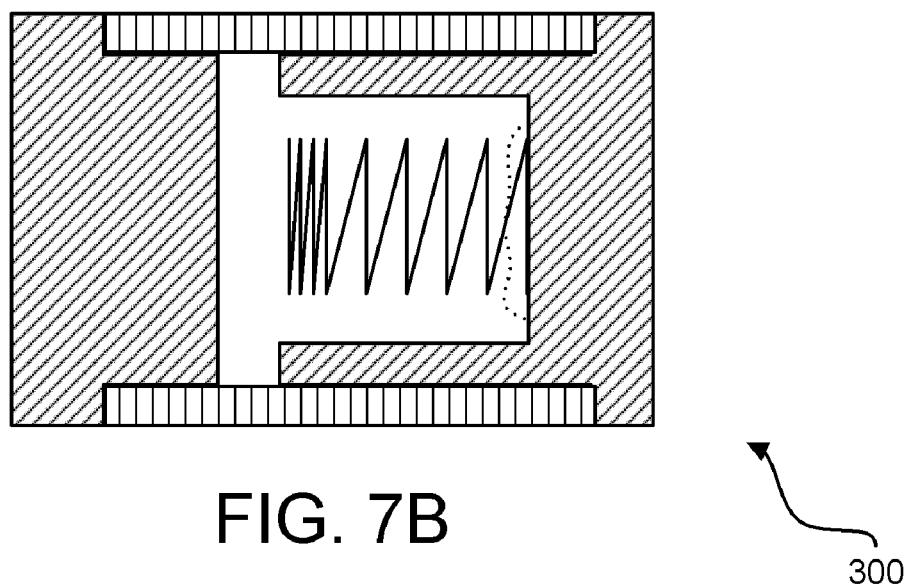

FIG. 7A and FIG. 7B illustrate an acceleration sensor that is similar to the acceleration sensor of FIG. 6A and FIG. 6B, however, the spring 390 is connected to the inner surface 382 of the second end cap 360 through one or more of many different means 386. Examples of such means may include, but are not limited to, a press fit, glue, heat seal, weld, solder, and a latching mechanism.

FIG. 8A, FIG. 8B, FIG. 8C, and FIG. 8D (hereafter, FIGS. 8A-8D) are cross-sectional side views of an acceleration sensor 400 in accordance with a third exemplary embodiment of the invention. Herein, FIG. 8A exemplifies the sensor 400 in an open position, while FIGS. 8B-8D exemplify the sensor 400 in a closed position. The sensor 400 of FIGS. 8A-8D is normally in an open position, where the spring 490 is connected to an inner surface 480 of a second end cap 460, but not connected to an inner surface 432 of a first end cap 410. It will be noticed that the first end cap 410 of the third exemplary embodiment contains a cylindrical lip 470, while the second end cap 460 does not contain a cylindrical lip. The spring 490 may be connected to the second end cap 460 through one or more of many different means 486. Examples of such means may include, but are not limited to, a press fit, glue, heat seal, weld, solder and a latching mechanism.

FIGS. 8B-8D illustrate examples of the acceleration sensor 400 in closed positions. Specifically, FIG. 8B illustrates the acceleration sensor 400 in a closed position when the sensor 400 is exposed to a horizontal acceleration causing the spring 490 to touch the inner surface 432 of the first end cap 410. Alternatively, FIGS. 8C and 8D illustrate the acceleration sensor 400 in a closed position when the sensor 400 is exposed to vertical accelerations, causing the spring 490 to touch the cylindrical lip 470 of the first end cap 410.

A further series of embodiments described herein not only contain a spring, but also contain at least one conductive weight. The following embodiments provide examples of sensors having a conductive spring and at least one conductive weight.

Figure 9:
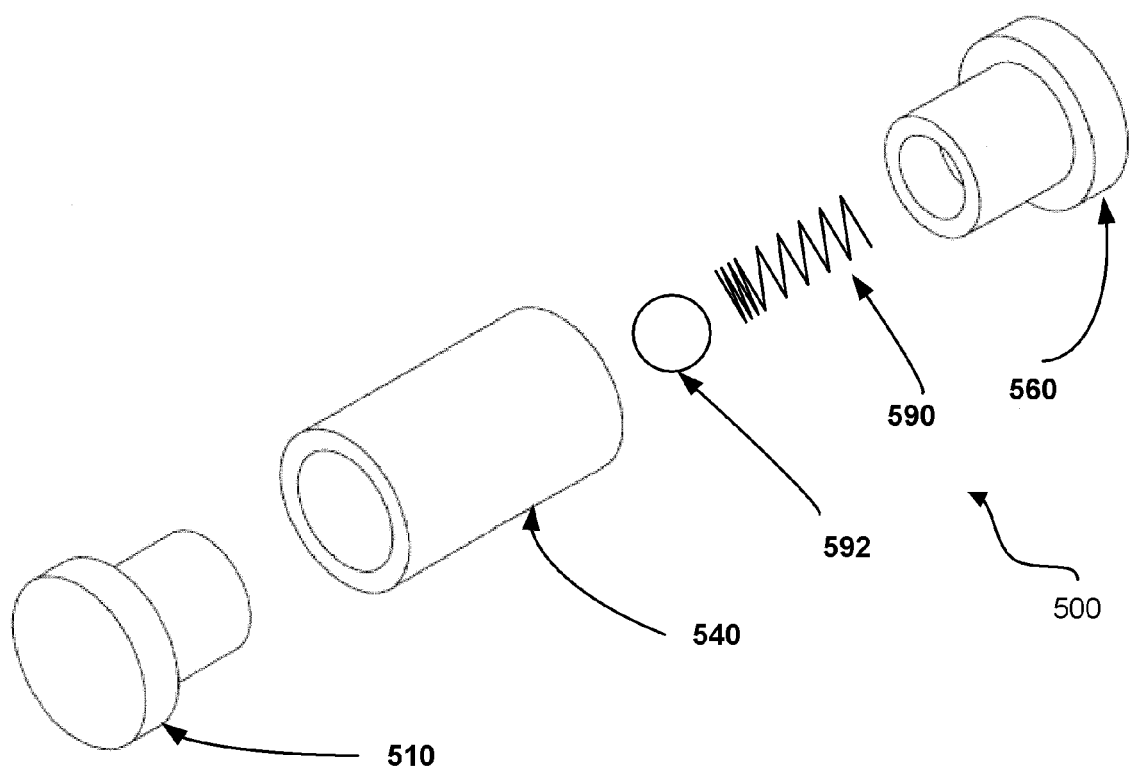
FIG. 9 is a cross-sectional side view of a sensor in accordance with a fourth exemplary embodiment of the invention.

Referring to FIG. 9, a sensor 500 in accordance with a fourth exemplary embodiment of the invention, contains a first end cap 510, a central member 540, a second end cap 560, a spring 590, and a conductive weight 592. The first end cap 510, the central member 540, the second end cap 560, and the spring 590 are the same as the same named portions of the sensor 100 of FIG. 5A and FIG. 5B.

Figure 10A:
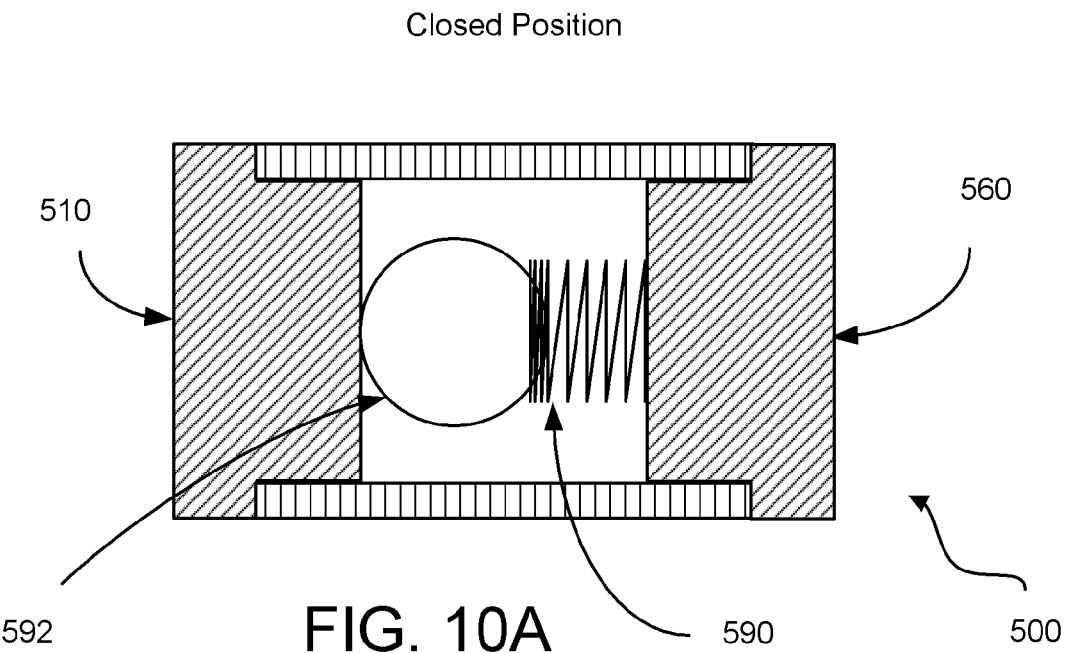
FIG. 10A and FIG. 10B are cross-sectional side views of the acceleration sensor in accordance with the fourth exemplary embodiment of the invention, where FIG. 10A exemplifies the sensor in a closed position and FIG. 10B exemplifies the sensor in an open position.
Figure 10B:
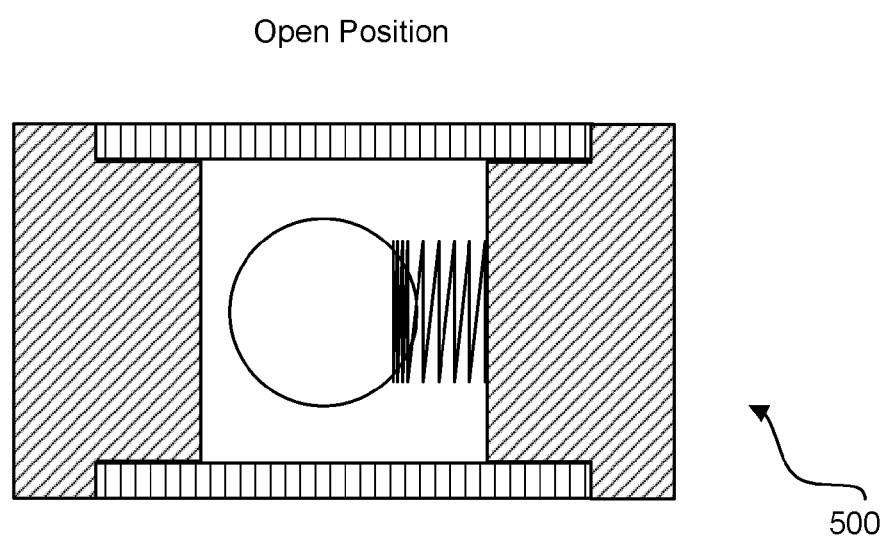

FIG. 10A and FIG. 10B are cross-sectional side views of the acceleration sensor 500 in accordance with the fourth exemplary embodiment of the invention, where FIG. 10A exemplifies the sensor 500 in a closed position and FIG. 10B exemplifies the sensor 500 in an open position. As shown by FIG. 10A and FIG. 10B, the conductive weight 592 is maintained between a first end of the spring 590 and the first end cap 510 by tension of the spring 590. To place the sensor 500 in an open position, the sensor 500 is subjected to a horizontal acceleration, resulting in the conductive weight 592 being displaced from the first end cap 510. It should be noted that the spring 590 is not fixed to the second end cap 560 and the spring 590 is not fixed to the conductive weight 592. In accordance with an alternative embodiment of the invention, the spring 590 may be press fit into the second end cap 560 and/or the conductive weight 592.

Figure 11A:
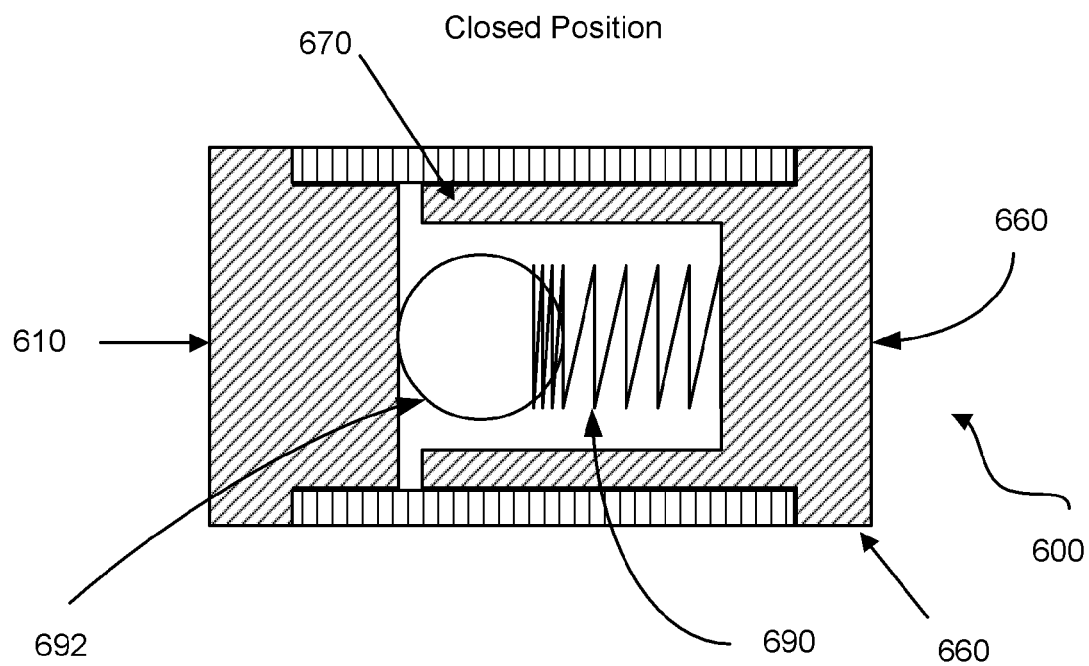
FIG. 11A and FIG. 11B are cross-sectional side views of an acceleration sensor in accordance with a fifth exemplary embodiment of the invention, where FIG. 11A exemplifies the sensor in a closed position and FIG. 11B exemplifies the sensor in an open position.
Figure 11B:
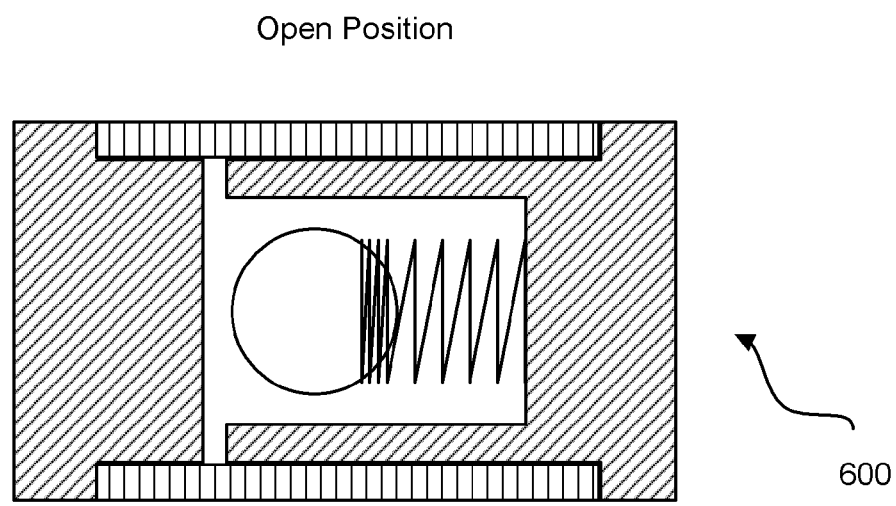
Figure 12B:
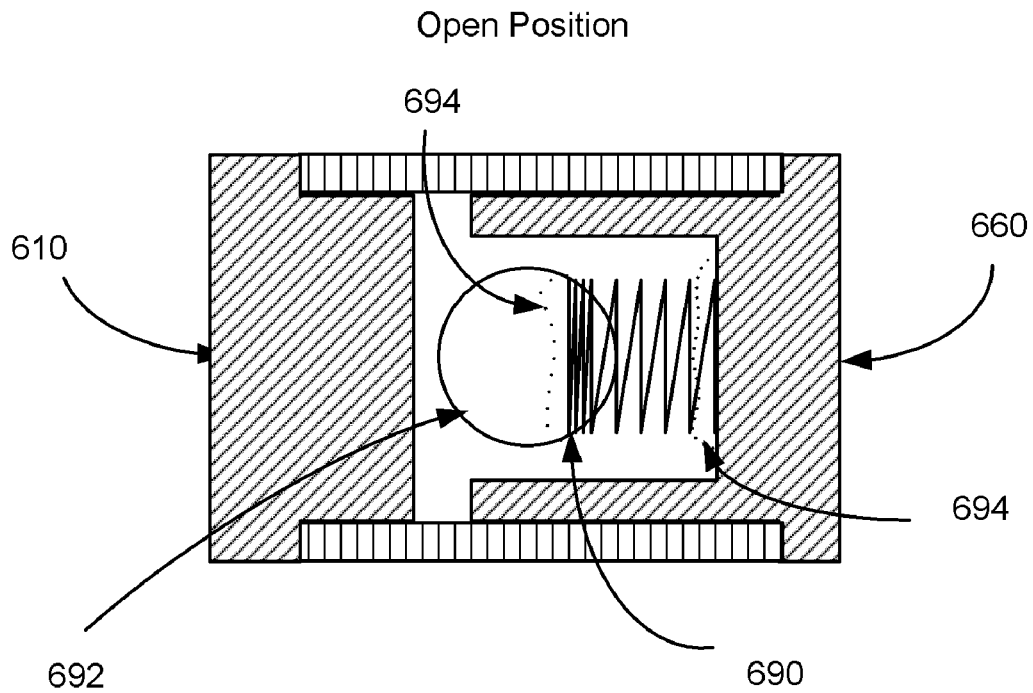
FIG. 12A and FIG. 12B are cross-sectional side views of the acceleration sensor of FIG. 11A and FIG. 11B, respectively, where the spring is fixed to the second end cap and the conductive weight.
Figure 12A:
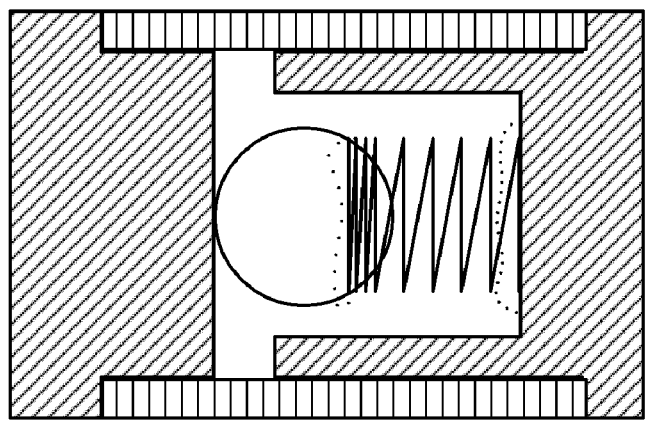
Figure 14A:
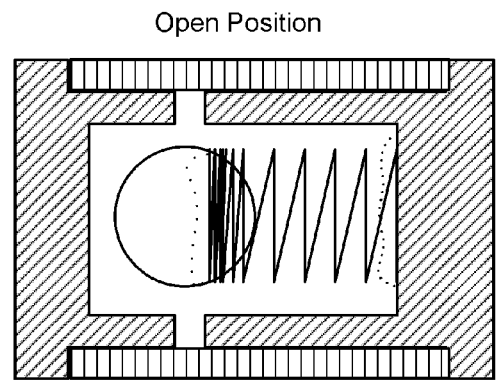
FIGS. 14A-14D are cross-sectional side views of a further embodiment of the acceleration sensor where both the first and second end caps have cylindrical lips.
Figure 14B:
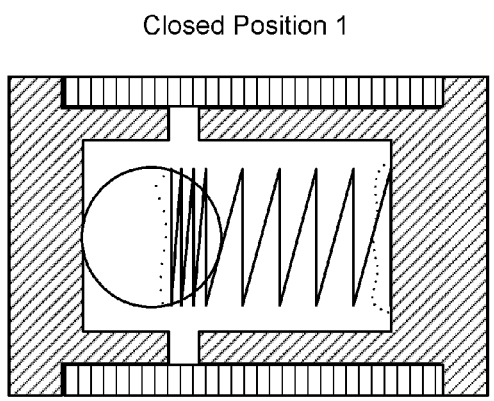
Figure 14C:
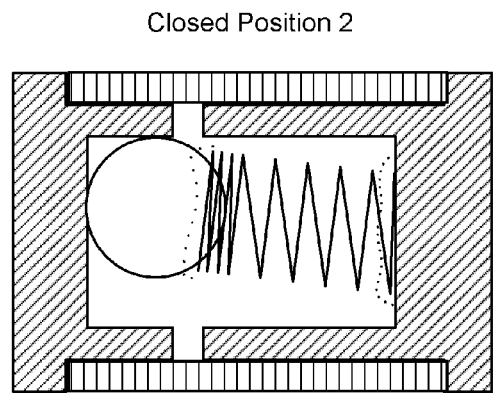
Figure 14D:
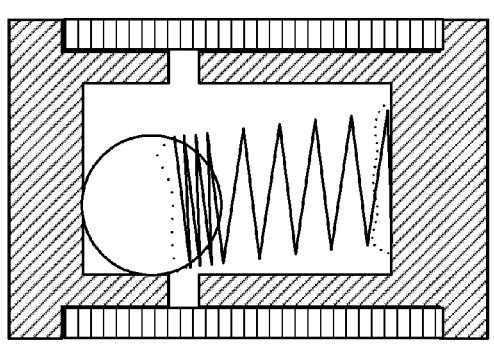

FIG. 11A and FIG. 11B are cross-sectional side views of an acceleration sensor 600 in accordance with a fifth exemplary embodiment of the invention, where FIG. 11A exemplifies the sensor 600 in a closed position and FIG. 11B exemplifies the sensor 600 in an open position. While a first end cap 610 of the fifth exemplary embodiment acceleration sensor 600 is the same as the first end cap 510 of the fourth exemplary embodiment, a second end cap 660 of the fifth exemplary embodiment is different from the second end cap 560 of the fourth exemplary embodiment. Specifically, the second end cap 660 contains a cylindrical lip 670 that extends further into a central cavity 680 of the acceleration sensor 600. Similar to the sensor 500 of the fourth exemplary embodiment, in the sensor 600 of the fifth embodiment the spring 690 is not fixed to the second end cap 660 and the spring 690 is not fixed to the conductive weight 692. Alternatively, the acceleration sensor 600 of FIG. 12A and FIG. 12B is the acceleration sensor 600 of FIG. 11A and FIG. 11B, respectively, where the spring 690 is fixed to the second end cap 660 and the conductive weight 692. Such fixing may be performed via use of a fixing means 694, such as, but not limited to, a press fit, glue, heat seal, weld, solder, and a latching mechanism.

FIG. 13A, FIG. 13B, FIG. 13C, and FIG. 13D (hereafter, FIGS. 13A-13D) are cross-sectional side views of an acceleration sensor 700 in accordance with a sixth exemplary embodiment of the invention. Herein, FIG. 13A exemplifies the sensor 700 in an open position, while FIGS. 13B-13D exemplify the sensor 700 in a closed position. The sensor 700 is normally in an open position, where the spring 790 is connected to an inner surface 780 of a second end cap 760, and the spring 790 is connected to a conductive weight 792, however, the conductive weight 792 is not connected to an inner surface 732 of a first end cap 710. It will be noticed that the first end cap 710 of the sixth exemplary embodiment contains a cylindrical lip 770, while the second end cap 760 does not contain a cylindrical lip. The spring 790 may be connected to the second end cap 760 and the conductive weight 792 through one or more of many different means 794. Examples of such means may include, but are not limited to, a press fit, glue, heat seal, weld, solder, and a latching mechanism.

FIGS. 13B-13D illustrate examples of the acceleration sensor 700 in closed positions. Specifically, FIG. 13B illustrates the acceleration sensor 700 in a closed position when the sensor 700 is exposed to a horizontal acceleration causing the conductive weight 792 to touch an inner surface 732 of the first end cap 710. Alternatively, FIGS. 13C and 13D illustrate the acceleration sensor 700 in a closed position when the sensor 700 is exposed to vertical forces, causing the conductive weight 792 to touch the cylindrical lip 770 of the first end cap 710. Alternatively, FIGS. 14A-14D illustrate a further embodiment wherein both the first and second end caps have cylindrical lips.

Figure 15A:
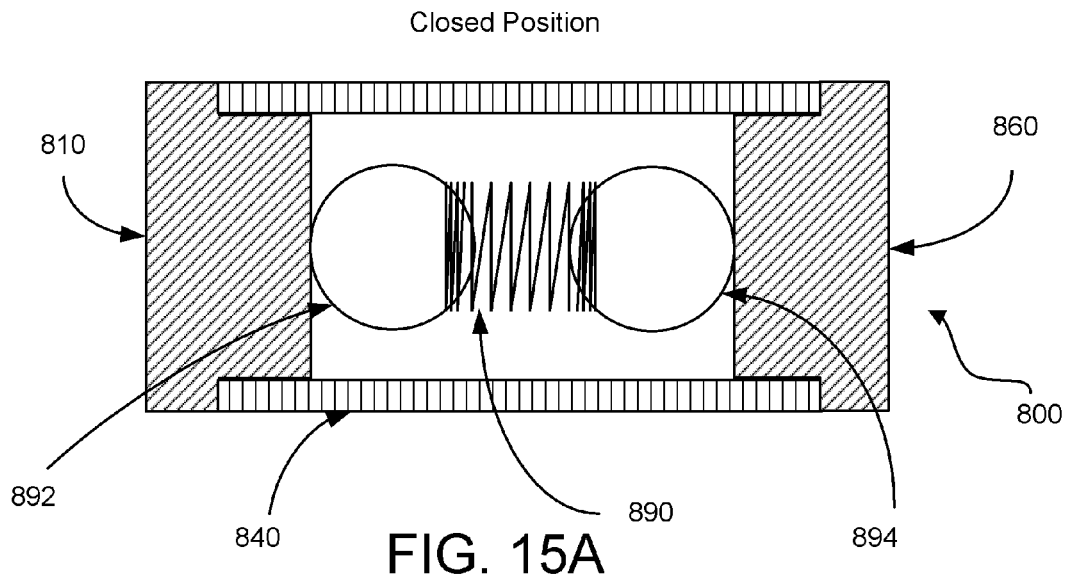
FIG. 15A and FIG. 15B are cross-sectional side views of an acceleration sensor in accordance with a seventh exemplary embodiment of the invention, where FIG. 15A exemplifies the sensor in a closed position and FIG. 15B exemplifies the sensor in an open position.
Figure 15B:
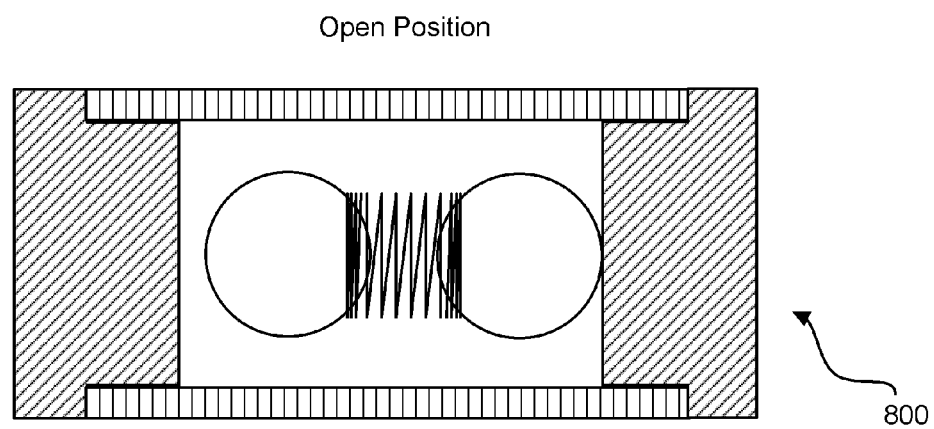

FIG. 15A and FIG. 15B are cross-sectional side views of an acceleration sensor 800 in accordance with a seventh exemplary embodiment of the invention, where FIG. 15A exemplifies the sensor 800 in a closed position and FIG. 15B exemplifies the sensor 800 in an open position. Referring to FIG. 15A and FIG. 15B, the sensor 800 contains a first end cap 810, a central member 840, a second end cap 860, a spring 890, and two conductive weights 892, 894. The first end cap 810, the second end cap 860, and the central member 840 of the seventh exemplary embodiment are the same as the first end cap 110, the second end cap 160, and the central member 840 of the first exemplary embodiment of the invention, except that the central member 840 of the seventh exemplary embodiment is longer than the central member 140 of the first exemplary embodiment of the invention.

As shown by FIG. 15A and FIG. 15B, the conductive weights 892, 894 are maintained in position by the spring 890. Subjecting the sensor 800 to a strong enough acceleration in the horizontal axis results in the sensor 800 being placed into the open position.

FIGS. 16A-16G are cross-sectional side views of different end caps that may be used in accordance with the invention. One having ordinary skill in the art would appreciate that additional end cap configurations may be provided and are all intended to be included within the present invention.

Figure 17:
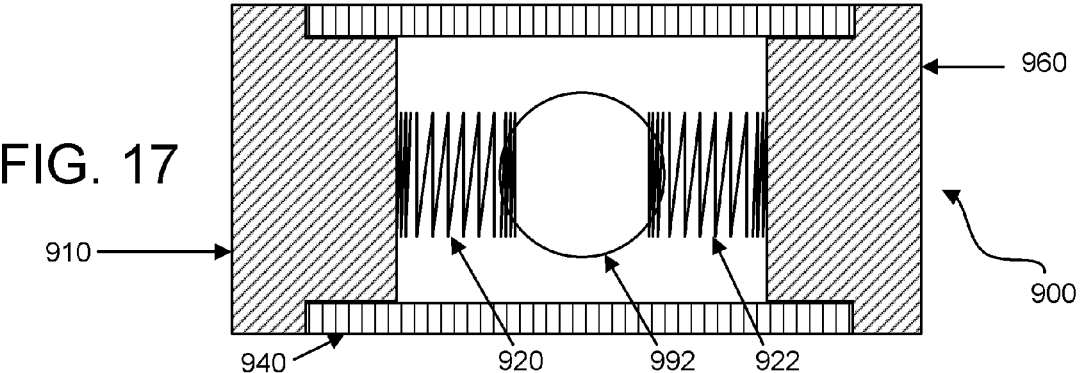
FIG. 17 is a cross-sectional side view of an acceleration sensor in accordance with an eighth exemplary embodiment of the invention.
Figure 16A:
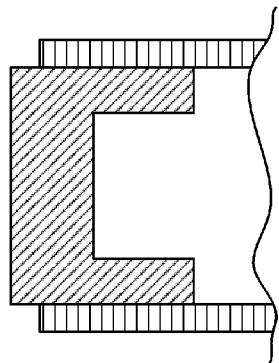
FIGS. 16A-16G are cross-sectional side views of different end caps that may be used in accordance with the invention.
Figure 16B:
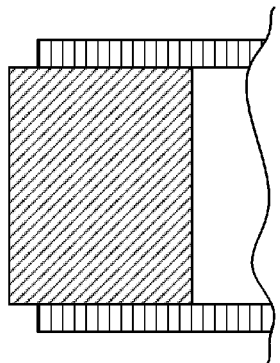
Figure 16C:
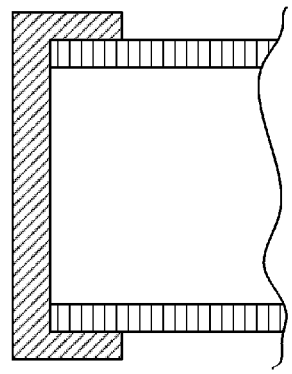
Figure 16D:
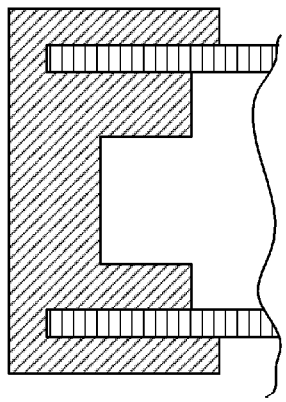
Figure 16E:
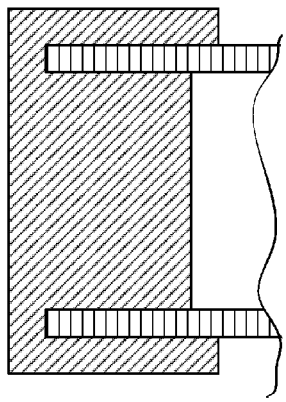
Figure 16F:
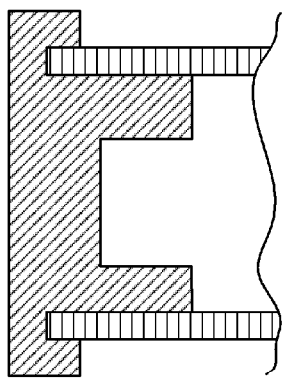
Figure 16G:
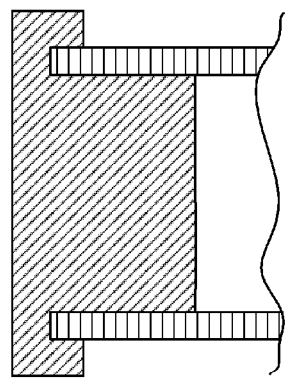

FIG. 17 is a cross-sectional side view of an acceleration sensor 900 in accordance with an eighth exemplary embodiment of the invention. The sensor 900 contains a first end cap 910, a central member 940, a second end cap 960, a first spring 920, a conductive weight 992, and a second spring 922.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

I claim:

1. A sensor, comprising:
a first electrically conductive element having a first diameter on a proximate portion of the first electrically conductive element and a second diameter on a distal portion of the first electrically conductive element, where the second diameter of the first electrically conductive element is smaller than the first diameter of the first electrically conductive element;
a second electrically conductive element having a first diameter on a proximate portion of the second electrically conductive element and a second diameter on a distal portion of the second electrically conductive element, where the second diameter of the second electrically conductive element is smaller than the first diameter of the second electrically conductive element, and wherein the distal portion of the first electrically conductive element faces the distal portion of the second electrically conductive element;
an electrically insulative element connected to the first electrically conductive element and the second electrically conductive element, where at least a portion of the first electrically conductive element and at least a portion of the second electrically conductive element make contact with the electrically insulative element;
at least one electrically conductive spring located within a cavity of the sensor, wherein the conductive spring has a diameter, and wherein the cavity is defined by at least one surface of the first electrically conductive element, at least one surface of the electrically insulative element, and at least one surface of the second electrically conductive element; and
at least one electrically conductive weight located within the cavity of the sensor and connected to a first end of the electrically conductive spring, wherein the electrically conductive weight has a diameter, wherein the diameter of the electrically conductive weight is larger than the entire diameter of the conductive spring so that the conductive spring pushes the electrically conductive weight.

2. The sensor of claim 1, wherein the sensor is in a closed state (ON) if a conductive path exists from the first electrically conductive element, through the at least one electrically conductive spring, through the at least one electrically conductive weight, to the second electrically conductive element, and wherein the sensor is in an open state (OFF) if there is no conductive path from the first electrically conductive element, through the at least one spring, through the at least one electrically conductive weight, to the second electrically conductive element.

3. The sensor of claim 1, where a first electrically conductive weight and a second electrically conductive weight are located within the cavity of the sensor.

4. A sensor, comprising:
a first electrically conductive element having a first diameter on a proximate portion of the first electrically conductive element and a second diameter on a distal portion of the first electrically conductive element, where the second diameter of the first electrically conductive element is smaller than the first diameter of the first electrically conductive element;
a second electrically conductive element having a first diameter on a proximate portion of the second electrically conductive element and a second diameter on a distal portion of the second electrically conductive element, where the second diameter of the second electrically conductive element is smaller than the first diameter of the second electrically conductive element, and wherein the distal portion of the first electrically conductive element faces the distal portion of the second electrically conductive element;
an electrically insulative element connected to the first electrically conductive element and the second electrically conductive element, where at least a portion of the first electrically conductive element and at least a portion of the second electrically conductive element make contact with the electrically insulative element;
at least one electrically conductive spring located within a cavity of the sensor, wherein the cavity is defined by at least one surface of the first electrically conductive element, at least one surface of the electrically insulative element, and at least one surface of the second electrically conductive element; and
at least one electrically conductive weight located within the cavity of the sensor and connected to a first end of the electrically conductive spring,
wherein a first electrically conductive weight and a second electrically conductive weight are located within the cavity of the sensor, and
wherein the first electrically conductive weight is connected to a first end of the electrically conductive spring and wherein the second electrically conductive weight is connected to a second end of the electrically conductive spring.

5. A sensor, comprising:
a first electrically conductive element having a first diameter on a proximate portion of the first electrically conductive element and a second diameter on a distal portion of the first electrically conductive element, where the second diameter of the first electrically conductive element is smaller than the first diameter of the first electrically conductive element;
a second electrically conductive element having a first diameter on a proximate portion of the second electrically conductive element and a second diameter on a distal portion of the second electrically conductive element, where the second diameter of the second electrically conductive element is smaller than the first diameter of the second electrically conductive element, and wherein the distal portion of the first electrically conductive element faces the distal portion of the second electrically conductive element;
an electrically insulative element connected to the first electrically conductive element and the second electrically conductive element, where at least a portion of the first electrically conductive element and at least a portion of the second electrically conductive element make contact with the electrically insulative element;
at least one electrically conductive spring located within a cavity of the sensor, wherein the cavity is defined by at least one surface of the first electrically conductive element, at least one surface of the electrically insulative element, and at least one surface of the second electrically conductive element; and
at least one electrically conductive weight located within the cavity of the sensor and connected to a first end of the electrically conductive spring,
wherein a first electrically conductive weight and a second electrically conductive weight are located within the cavity of the sensor, and
wherein the sensor is in a closed state (ON) if a conductive path exists from the first electrically conductive element, through the first electrically conductive weight, through the at least one electrically conductive spring, through the second electrically conductive weight, to the second electrically conductive element, and wherein the sensor is in an open state (OFF) if there is no conductive path from the first electrically conductive element, through the first electrically conductive weight, through the at least one spring, through the second electrically conductive weight, to the second electrically conductive element.

6. The sensor of claim 1, wherein the sensor contains a second electrically conductive spring, wherein the sensor is in a closed state (ON) if a conductive path exists from the first electrically conductive element, through the first electrically conductive spring, through the at least one electrically conductive weight, through the second electrically conductive spring, to the second electrically conductive element, and wherein the sensor is in an open state (OFF) if there is no conductive path from the first electrically conductive element, through the first electrically conductive spring, through the at least one electrically conductive weight, through the second electrically conductive spring, to the second electrically conductive element.

* * * * *